Figure 1:
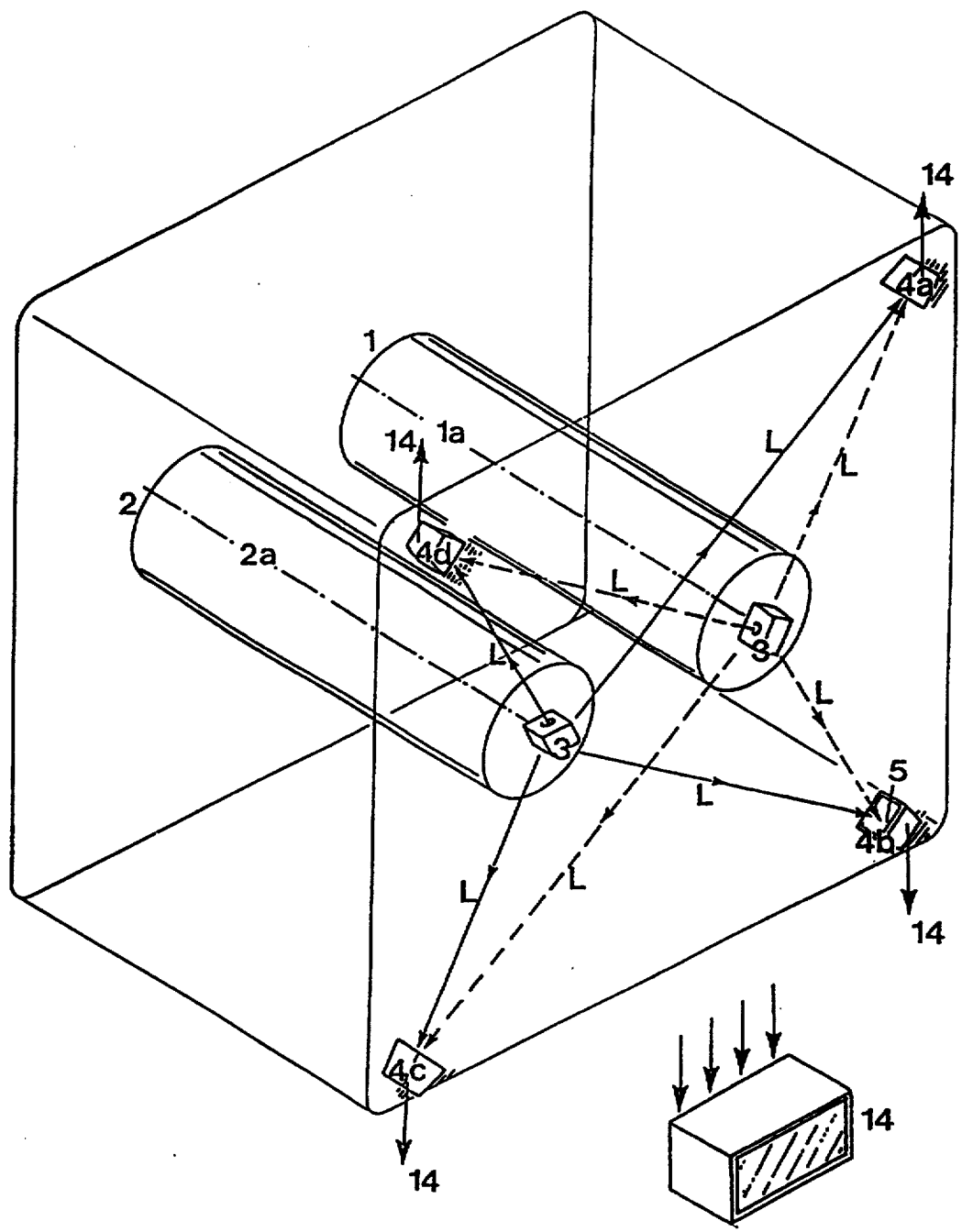

United States Patent [19]

Lysen

[11] Patent Number: 5,430,539

[45] Date of Patent: Jul. 4, 1995

[54] METHOD AND ARRANGEMENT FOR CHECKING ALIGNMENT OF BODY AXES FOR PARALLELISM

[75] Inventor: Heinrich Lysen, München, Germany

[73] Assignee: Pruftechnik Dieter Busch AG, Oskar-Messter-Strasse, Germany

[21] Appl. No.: 773,948

[22] PCT Filed: Mar. 21, 1990

[86] PCT No.: PCT/EP91/00082

§ 371 Date: Sep. 16, 1994

§ 102(e) Date: Sep. 16, 1994

[87] PCT Pub. No.: WO91/14922

PCT Pub. Date: Oct. 3, 1991

[30] Foreign Application Priority Data

Mar. 21, 1990 [DE] Germany ............... 40 09 146.5

[51] Int. Cl.[6] ................. G01B 11/26; G01C 1/00
[52] U.S. Cl. ................. 356/152.1; 33/286; 356/139.03; 356/141.3
[58] Field of Search ......... 33/286; 356/152.1, 139.03, 356/141.3

[56] References Cited

U.S. PATENT DOCUMENTS

| | | |
|---|---|---|
| 3,603,691 | 9/1971 | Hamilton ............... 356/152.1 |
| 3,923,402 | 12/1975 | Turcotte ............... 33/286 |
| 4,209,254 | 6/1980 | Reymond et al. | |
| 4,298,281 | 11/1981 | Schave ............... 356/153 |
| 4,701,018 | 10/1987 | Loucks ............... 356/153 |

FOREIGN PATENT DOCUMENTS

| | | |
|---|---|---|
| 0250768 | 1/1988 | European Pat. Off. |
| 3320163 | 12/1984 | Germany . |
| 2128324 | 4/1984 | United Kingdom . |
| 9114922 | 10/1991 | WIPO . |

Primary Examiner—Stephen C. Buczinski
Attorney, Agent, or Firm—Kirkpatrick & Lockhart

[57] ABSTRACT

A method is proposed for checking the alignment of body axes for parallelism, which method can be carried out in simple manner with low effort in auxiliary apparatus means and yet delivers highly accurate measurement results. In the method, a measurement beam L, preferably a laser beam, is emitted transversely to the body axis of each body 1 and 2 and on rotation about the body axis impinges on at least three detectors 4a, 4b, 4c, 4d and 4e in succession, which respectively deliver a signal denoting the position of the point of incidence along a detector axis 5 of the respective detector. From the detector signals and the relative position, which optionally is separately determined, of points of intersection of the body axes and the detector axes with a surface spanned by a measurement beam, the relative spatial position for each body axis with respect to a reference axis is computed. Also proposed is a particularly suitable device for carrying out the method.

15 Claims, 6 Drawing Sheets

METHOD AND ARRANGEMENT FOR CHECKING ALIGNMENT OF BODY AXES FOR PARALLELISM

The invention relates to a method for the purpose indicated in the classifying clause of patent claim 1 and to an arrangement for the performance of this method.

In technology, the problem frequently arises of precisely determining the extent to which axes, denoted in the following as body axes, of adjacently disposed bodies or parts of bodies, which should be aligned parallel to each other in the ideal case, depart from the ideal state of parallelism, as it is known before the checking only that the axes are oriented at least approximately parallelly to each other. Examples of such problems are parallelism checking of co-operating rollers which are arranged beside each other and optionally also at a larger spacing, or parallelism checking of planar surface regions of a body with utilisation of the condition that a perpendicular line erected above a certain point of these surfaces is parallel to the perpendicular lines erected above any desired other points thereof and thus can be utilised as a characteristic for the position of the respective planar surface in space. Knowledge of the approximate parallelism of the body axes at the beginning of the precision measuring is obtained from, for example, a coarse preliminary alignment of the rollers or a previous preliminary orientation, possibly a preliminary treatment, of the body surfaces.

The invention is based on the task of creating a method according to the classifying clause of claim 1, which method can be performed in simple manner with low effort in auxiliary apparatus means and yet delivers highly accurate measurement results.

The foregoing problem is solved by the method steps stated in the characterising part of claim 1.

With use of the method according to the invention, it is possible in simple manner to precisely determine whether the mutual alignment of the body axes is within an acceptable deviation from the ideal state of parallelism or which corrections must be undertaken in order to improve mutual alignment to be within the permissible tolerance range.

Subclaims 2 to 9 concern preferred embodiments of the method according to claim 1.

Claim 10 has as its subject an arrangement suitable for carrying out the method according to the invention and subclaims 11 to 15 concern preferred embodiments of the arrangement according to claim 10.

The invention is explained more closely in the following by reference to the embodiment of measurement of parallelism of the centre lines of two adjacently arranged rollers.

Figure 2:
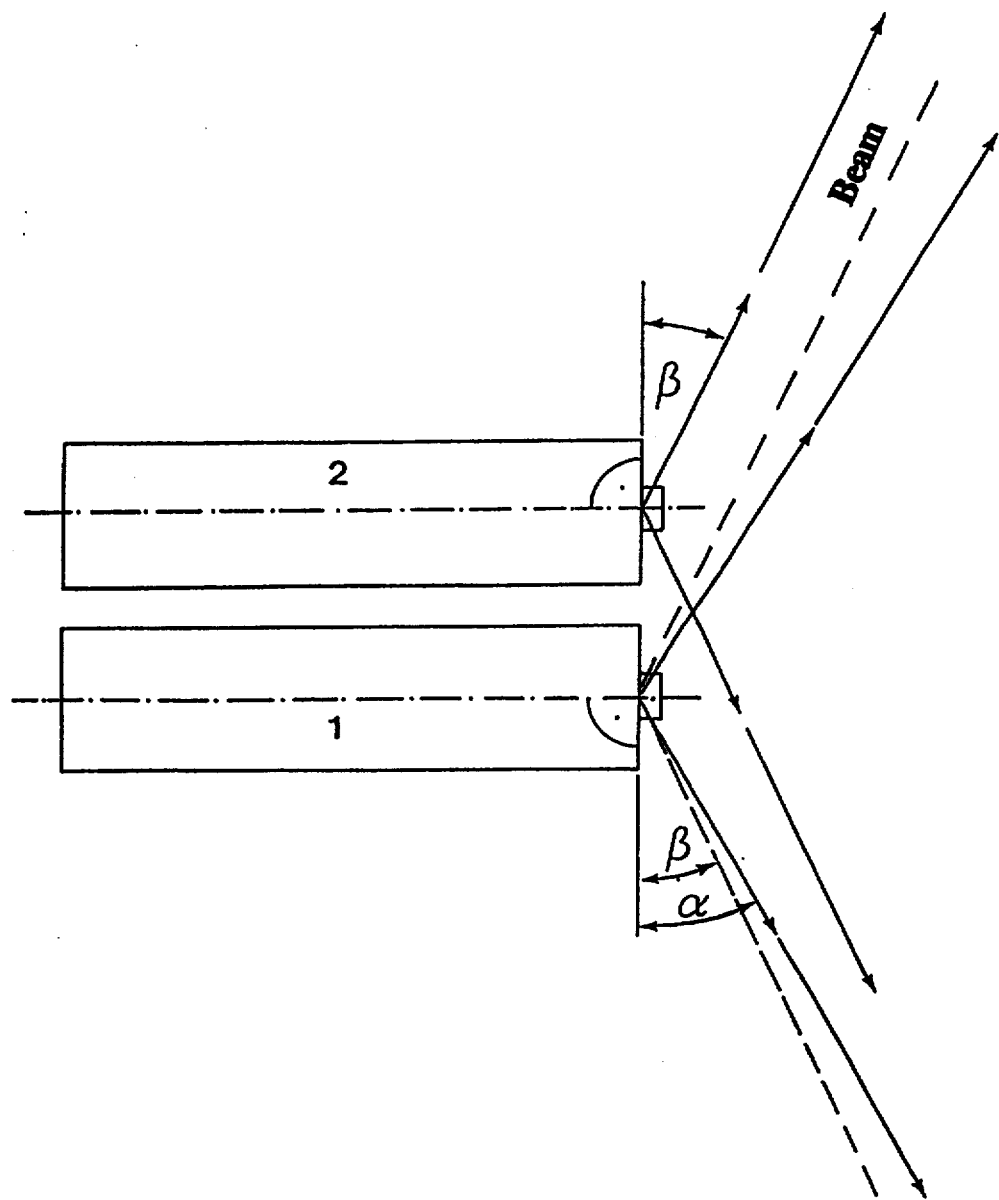
Figure 3:
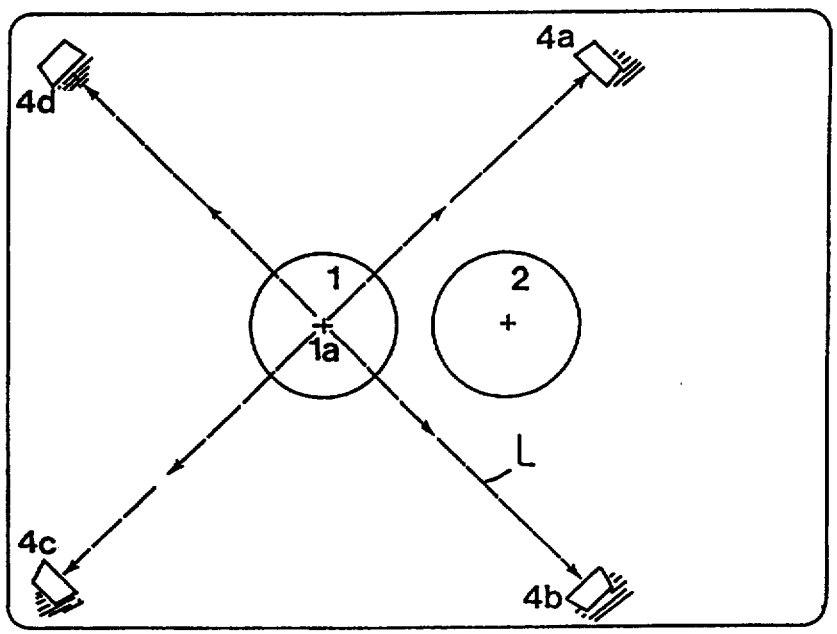
Figure 4:
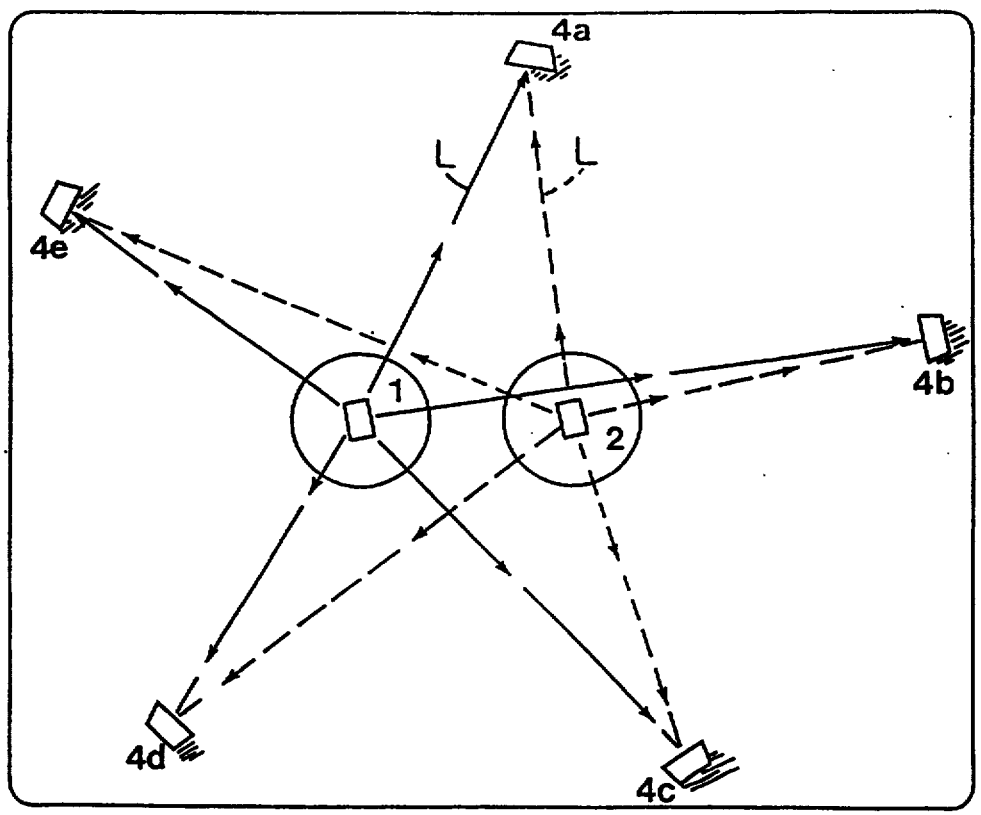

In the drawing there is shown respectively in schematic illustration:

FIG. 1 in perspective, the two rollers with detectors arranged at their ends therearound in a common measurement plane approximately perpendicular to their centre lines, as well as a laser beam emitted from one of the detectors approximately perpendicularly to the respective centre line, FIG. 2 the plan view of the arrangement according to FIG. 1, FIG. 3 the arrangement according to FIG. 1, as seen from the front with viewing direction parallel to the centre lines of the rollers, FIG. 4 a modification of the arrangement according to FIGS. 1 to 3, FIG. 5 a perspective illustration of a single roller with a laser beam emitted therefrom with indication of measurement magnitudes which are significant for the method according to the invention and which in part result from a departure from parallelism relative to a reference axis, and FIGS. 6 to 10 different embodiments of a device for emission of the laser beam from the shafts to be checked.

FIG. 1 shows two adjacently disposed rollers 1 and 2, the centre lines $1a$ and $2a$ of which are at least approximately parallel to each other and the mutual position of which is to be checked for parallelism or for exact extent of departure from the ideal state of a desired parallel alignment. For this check, a laser beam transmitter 3 is so detachably fastenable by means of a suitable attachment device, for example one of the attachment devices $11a$ to $11e$ illustrated in FIGS. 6 to 10, to each roller 1 and 2 that it emits the laser beam L, which it generates in the form of a parallel light bundle of very small diameter, approximately perpendicularly to the centre line $1a$ or $2a$ of the respective roller 1 or 2. In addition, four uniaxial, position detectors $4a$, $4b$, $4c$ and $4d$ are so arranged at a mutual spacing around the rollers 1 and 2 for relative position checking of the centre lines $1a$ and $2a$ that their measurement axes 5 each extend approximately parallel to the centre lines $1a$ and $2a$ and pass through each of the surfaces which the laser beam L spans during successive rotation of the beam transmitters 3 about the centre lines $1a$ and $2a$. This rotation can be produced either by the rollers 1 and 2 being rotated, with the respective beam transmitter 3 rigidly fastened thereto, by means of for example the attachment device $11a$ according to FIG. 6, or by the beam transmitter 3 being rotated with respective stationary roller 1 or 2 by means of an attachment device specially provided for this purpose, for example one of the attachment devices $11b$ to $11e$ according to FIGS. 7 to 10.

As is illustrated in exaggerated manner in FIG. 2, it does not matter whether the laser beam L is emitted precisely perpendicularly to the respective centre line $1a$ or $2a$ or in principle whether the emission angles $\alpha$ or $\beta$ for the individual rollers 1 and 2 are equal to each other. Whether this is necessary in a particular case depends on the number and mutual arrangement of the detectors. It is merely important that the laser beam L from each roller 1 and 2 impinges on the measurement axis 5 of each detector during the rotation. Furthermore, it is expedient if the laser beam is emitted at least approximately perpendicularly to the body axis $1a$ or $2a$.

In the special case of use of four detectors as evident in FIGS. 1 and 3, it is necessary to ensure that, as indicated by dashed lines for the upper roller in FIG. 2, the laser beam L is emitted from each of the two rollers 1 and 2 at the same angle $\alpha$ or that, as indicated in FIG. 3, the detectors $4a$ to $4d$ are arranged at approximately the same radial spacing around the reference axis, which is explained more closely below and assumed in FIG. 3 to coincide with the centre line $1a$ of the roller 1. With use of five detectors $4a$ to $4e$ according to FIG. 4, the beam emission angle $\alpha$ or $\beta$ can by contrast differ from roller to roller as does the radial detector spacing. In FIG. 2, this is illustrated by the angle $\alpha$ for the lower roller 1 and by the angle $\beta$ for the upper roller 2 and is reproduced in FIG. 4 in respect of the spacing.

For the checking of the mutual alignment of the two centre lines 1a and 2a, the beam transmitter is initially mounted at one of the two rollers 1 and 2 and rotated about the respective centre line 1a or 2a over such an angular range that the laser beam L impinges on each of the detectors 4a to 4d in succession. The detectors in that case each deliver a signal which indicates the position of the point of incidence of the laser beam L along the detector axis 5.

The signals are stored for later computer evaluation.

Subsequently, the same process is repeated with the beam transmitter transferred to the other roller.

From the detector signals thus obtained and the relative position, which optionally is ascertained separately, of the points of intersection of the roller centre lines 1a, 2a and the detector axes 5 with one of the two surfaces spanned by the laser beam L during the two afore-described measurement processes, the relative spatial position of each centre line 1a and 2a with respect to a predetermined reference axis, which is at least approximately parallel thereto in consequence of a preceding coarse alignment and which by means of a measurement process of the afore-described kind has been included in the detection, is computed, preferably by means of a program-controlled computer 14. In cases in which only the relative position of two body axes is of concern, such as in the example of the relative position of the centre lines 1a and 2a, one of these centre lines can be utilised as the reference axis; otherwise, if a specific orientation in space is additionally required, a separate reference axis can be used.

The computation of the spatial or mutual position of the body axes 1a and 2a can be carried out by known computation methods on the basis of the detector signals obtained by means of the measurement process and other necessary measurement data in the form of the relative position, which need be ascertained only once, of points of intersection of the above-mentioned kind. These computation methods comprise, for example, setting-up and solution of a linear equation system with a number of equations corresponding to the number of unknown magnitudes which are sought, as well as optionally the determining and compensating for measurement errors by the method of least squares.

Figure 5:
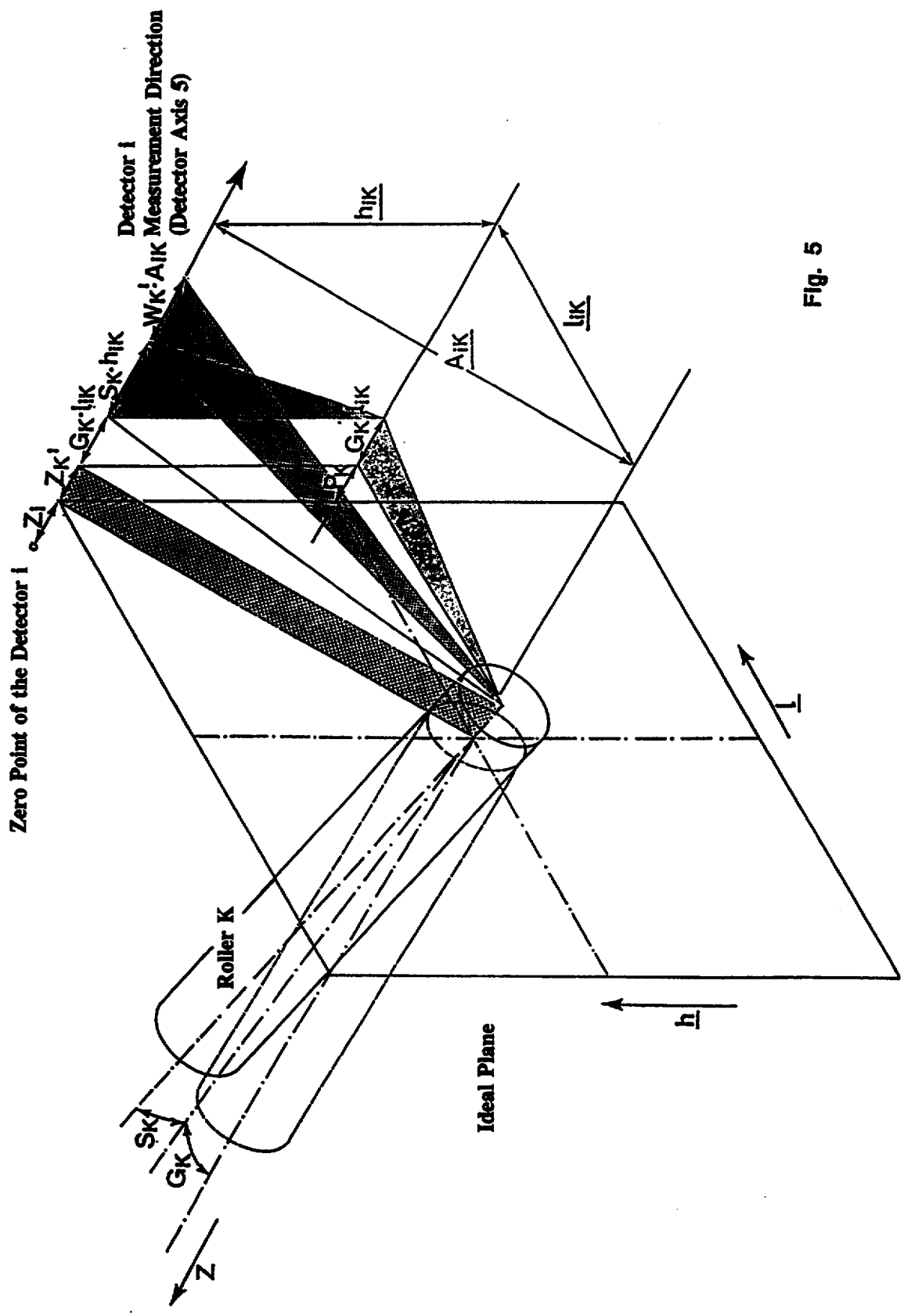

FIG. 5 illustrates, in connection with one of the rollers, the measurement magnitudes which arise at the individual detectors or additionally are to be separately determined. The measurement magnitudes which are to be separately determined and to be measured by, for example, a measuring tape or the like are underlined in FIG. 5. As the reference axis in FIG. 5 there is assumed an axis Z for which the basic values have been determined on the measurement detectors by a measurement process of the afore-described kind. Relative to this reference axis Z, the centre line or body axis K has an angular displacement which results in the measurement magnitudes, denoted by an index k in FIG. 5, along the detector axis 5 of that detector i which has just been hit by the measurement beam L. $Z_i$ is the spacing of the detector zero point from the ideal plane, $Z_K$, or $P_K$ is the displacement of the laser beam L in Z direction relative to the ideal plane, and $W_K$,$.A_iK$ is the angular displacement of the laser beam L relative to the direction of projection perpendicular to the centre line of the roller K.

I claim:

1. Method for checking the alignment of approximately mutually parallel axes of adjacently disposed bodies or parts of bodies (body axes) for parallelism, characterised in that
   a) a parallel measurement beam (L) of an electromagnetic radiation, especially a laser beam (L), is emitted from each body (1, 2) or body part at least approximately radially with respect to the respective body axis (1a, 2a) and is rotated therearound,
   b) at least three detectors (4a, 4b, 4c, 4d, 4e), which on incidence of a measurement beam (L) on a detector axis (5) each deliver a signal which indicates the position of the point of incidence of the measurement beam along this detector axis, are so arranged in spatially fixed position at a spacing from each body axis (1a, 2a) and at a mutual spacing therearound before the method step (a) that their detector axes (5) each extend approximately parallel to the body axes (1a, 2a) through all surfaces which are spanned by the measurement beams (L), which are respectively emitted from the bodies (1, 2) or body parts, during rotation of these beams,
   c) for each body axis (1a, 2a) the relative spatial position thereof with respect to a predetermined reference axis, which is at least approximately parallel thereto and which is included in the detection according to (a) and (b) and optionally is a body axis (1a or 2a) selected from the body axes, is computed from the detector signals and the relative position, which optionally is separately determined, of the points of intersection of the body axes (1a, 2a) and the detector axes (5) with one of the surfaces spanned by a measurement beam (L).

2. Method according to claim 1, characterised in that three detectors are used and the measurements beams (L) are all emitted as precisely as possible in a plane perpendicular to the respective body axis (1a, 2a).

3. Method according to claim 1, characterised in that four detectors (4a to 4d) are used and the measurement beams (L) are emitted from the individual bodies (1, 2) or body parts as precisely as possible at the same angle with respect to the relevant body axis (1a, 2a).

4. Method according to claim 1, characterised in that four detectors (4a to 4d) are used and are so arranged with measurement beam emission angles which differ from body axis to body axis that they have approximately the same spacing from the reference axis (1a).

5. Method according to claim 1, characterised in that five detectors (4a to 4e) are used.

6. Method according to claim 1 characterised in that the measurement beam (L) is fixed relative to the body in the case of at least one body (1, 2) or body part, and the body or body part is rotated.

7. Method according to claim 1 characterised in that at least one body (1) or body part is stationary during the check, and the associated measurement beam (L) is rotated about an auxiliary axis (H) of an attachment device (11a, 11b, 11c, 11d) which is mountable at the body (1, 2) or body part and which with respect to the body axis (1a) is set in a known spatial reference position that is the same for each stationary body (1) or body part. (FIGS. 7 to 10.)

8. Use of the method according to claim 1 for checking the rotational axes of adjacently disposed shafts or rollers for parallelism.

9. Use of the method according to claim 1 for checking of adjacently disposed planar body surfaces for parallelism, wherein axes perpendicular to the body surfaces are utilised as the body axes.

10. Arrangement for carrying out the method according to claim 1 characterised by
   a) a measurement beam transmitter (3) for emission of a substantially parallelly bundled measurement beam (L) of an electromagnetic radiation, especially a laser beam,
   b) an attachment device (10, 11a, 11b, 11c, 11d) which is connected with the measurement beam transmitter (3) for arrangement thereof at the individual bodies (1) or body parts in such a manner that the measurement beam transmitter (3) emits the measurement beam (L) at least approximately radially of a predetermined axial direction, which is to be measured, with respect to the respective body (1) or body part,
   c) at least three opti-electronic detectors (4a to 4e), which each have a respective detector axis (5) and are individually settable in spatially fixed position, for the delivery of electrical signals denoting the point of incidence of a beam (L), impinging on the detector axis (5), of an electromagnetic radiation along this axis (5).

11. Arrangement according to claim 10, characterised in that the attachment device (11a) is rigidly attachable to the respective body (1) or body part (FIGS. 6, 7, 9 and 10).

Figure 6:
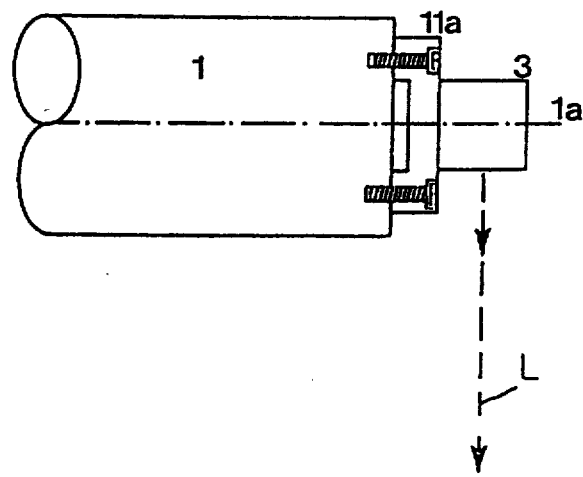

12. Arrangement according to claim 11, characterised in that the measurement beam transmitter (3) is rigidly connected to the attachment device (FIG. 6).

Figure 7:
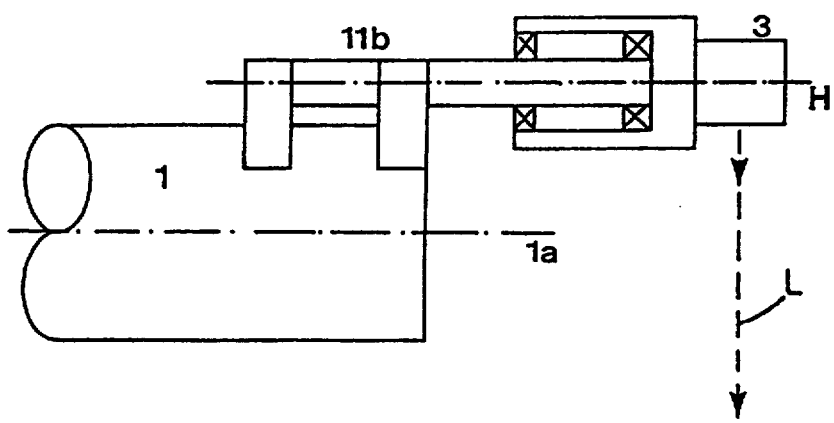
Figure 9:
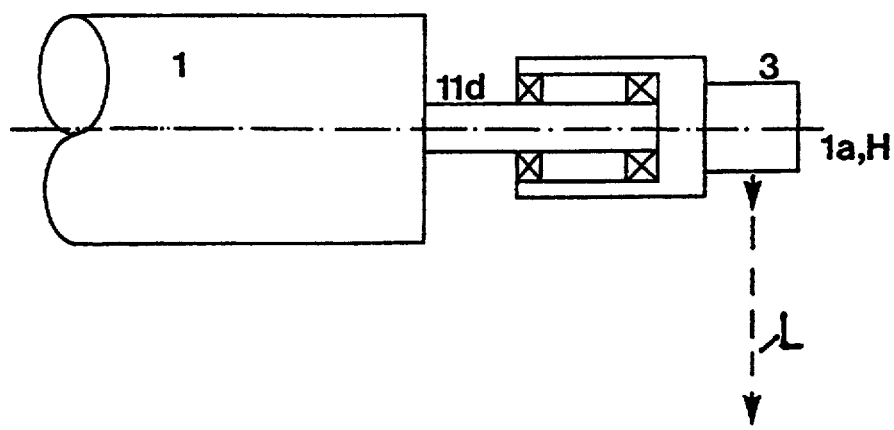
Figure 10:
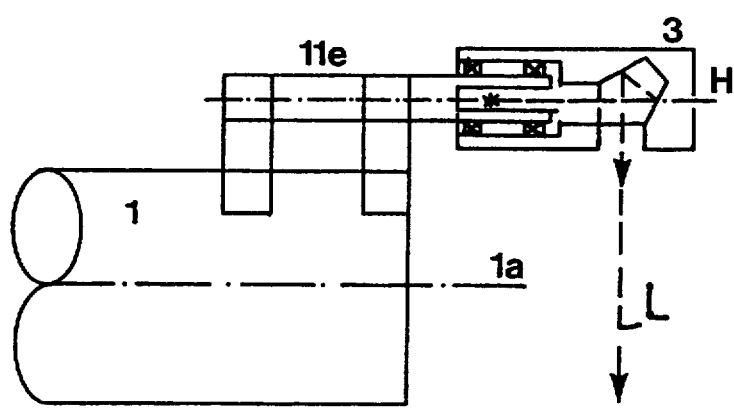

13. Arrangement according to claim 11, characterised in that the measurement beam transmitter (3) at the attachment device (11b, 11d, 11e) is rotatable by this about an axis (H) which, in the state of attachment of the attachment device to the body (1) or body part, is approximately parallel to or coincides with the body axis (1a) (FIGS. 7, 9 and 10).

Figure 8:
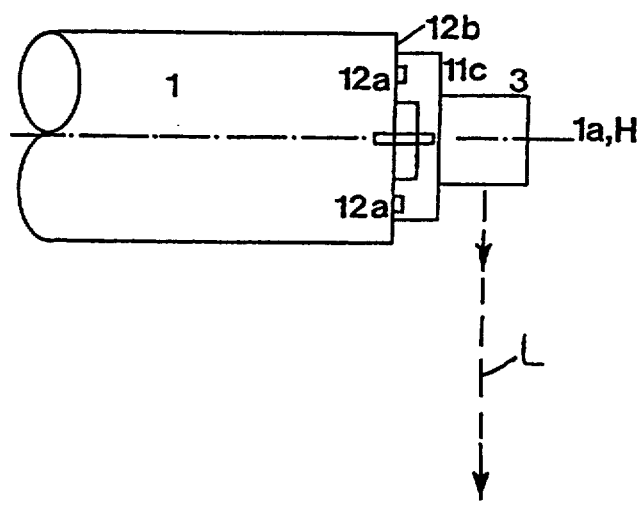

14. Arrangement according to claim 10, characterised in that the attachment device (11c) is mountable at the respective body (1) or body part to be rotatable about the body axis (1a) and the measurement beam transmitter (3) is rigidly mounted at it (FIG. 8).

15. Arrangement according to claim 10, characterised thereby, that the attachment device (11c) has a planar mounting surface (12a) for mounting at a planar body surface (12b) perpendicular to the body axis, and the measurement beam transmitter (3) is rigidly fastened to the attachment device (11c) with a measurement beam emission direction approximately parallel to the mounting surface (12a) (FIG. 8).

* * * * *